A. Stow.
Upsetting Tires.
N° 55,735.                        Patented Jun. 19, 1866.
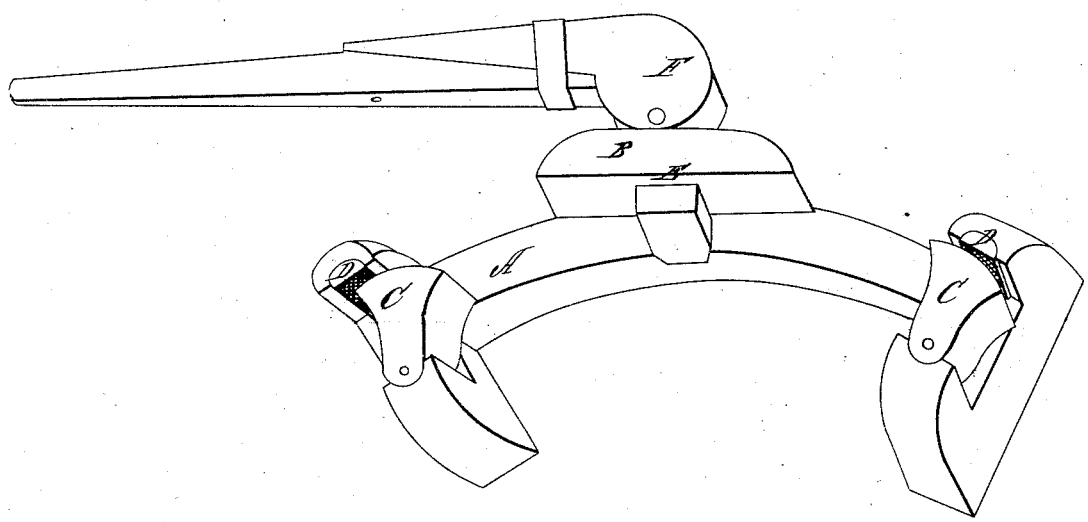
Witnesses:
Sidney O. Wells
True A. Town
Inventor
Alonzo Stow

UNITED STATES PATENT OFFICE.

ALONZO STOW, OF CALAIS, VERMONT.

IMPROVED DEVICE FOR UPSETTING TIRES.

Specification forming part of Letters Patent No. 55,735, dated June 19, 1866.

*To all whom it may concern:*

Be it known that I, ALONZO STOW, of Calais, in the county of Washington and State of Vermont, have invented a new and Improved Mode of Upsetting Wagon-Tires without the process of cutting and welding; and I do hereby declare that the following is a full and exact description thereof, reference being had to the accompanying drawings, and to the letters of reference marked thereon.

The nature of my invention consists in providing a suitable arrangement for holding the heated tire, and at the same time, by the use of an eccentric or cam lever used for the purpose, straighten the tire, thereby making it any desired amount shorter.

To enable others skilled in the art to make and use my invention, I will proceed to describe its construction and operation.

The main piece or body of my machine, A, is made of cast-iron, in a circular form, provided at each end with vertical projections with cavities in them to hold the self-adjusting jaws or holders D D and C C, which are at liberty to adjust themselves to tire of any desired circle.

In the middle of the main casting I construct a mortise or cavity to keep in place the guide or straightener B.

By placing the heated tire in the slot E in the straightener or guide, and between the jaws C D C D at the ends, with the lever F swung round to one side, as represented in the drawing, the tire is ready for upsetting. The operator then swings the lever round to the opposite side, and the tire is sufficiently shortened.

What I claim as my invention, and desire to secure by Letters Patent, is—

A tire-upsetting machine with self-adjusting jaws or holders, and operated by an eccentric or cam lever, substantially as set forth.

ALONZO STOW.

Witnesses:
   SIDNEY O. WELLS,
   TRU. A. TOWN.